(12) United States Patent
Durrant et al.

(10) Patent No.: US 12,332,154 B2
(45) Date of Patent: *Jun. 17, 2025

(54) AUTOMATED SPECIMEN PROCESSING SYSTEMS AND METHODS

(71) Applicant: Ventana Medical Systems, Inc., Tucson, AZ (US)

(72) Inventors: Timothy James Durrant, Camberwell (AU); Matthew Ketterer, Oro Valley, AZ (US); Michael Schurig, Tucson, AZ (US); Jorge Nicholas Quijada, Oro Valley, AZ (US); John Douglas Willems, Jr., Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 367 days.

This patent is subject to a terminal disclaimer.

(21) Appl. No.: 17/331,231

(22) Filed: May 26, 2021

(65) Prior Publication Data
US 2021/0293672 A1 Sep. 23, 2021

Related U.S. Application Data

(63) Continuation of application No. 15/385,863, filed on Dec. 21, 2016, now Pat. No. 11,047,774, which is a
(Continued)

(51) Int. Cl.
*G01N 1/31* (2006.01)
*G01N 35/00* (2006.01)
*B01L 9/00* (2006.01)

(52) U.S. Cl.
CPC ....... *G01N 1/312* (2013.01); *G01N 35/00029* (2013.01); *G01N 35/0092* (2013.01);
(Continued)

(58) Field of Classification Search
CPC ............ G01N 1/312; G01N 35/00029; G01N 35/0092; G01N 35/0099; G01N 2001/315;
(Continued)

(56) References Cited

U.S. PATENT DOCUMENTS 5,386,318 A * 1/1995 Kuhnert ................. G01N 35/04
414/744.8
5,690,892 A 11/1997 Babler et al.
(Continued)

FOREIGN PATENT DOCUMENTS

CN 1726386 1/2006
CN 1726386 A 1/2006
(Continued)

*Primary Examiner* — P. Kathryn Wright
*Assistant Examiner* — Curtis A Thompson
(74) *Attorney, Agent, or Firm* — Charney IP Law LLC; Thomas M. Finetti

(57) ABSTRACT

The disclosure presents systems and methods for processing a specimen slide using a specimen processing system. Specimen slides may sequentially be ejected from a slide carrier towards a label reader to determine an appropriate processing protocol for the slides. A cracking element may be engaged with the slide carrier prior to ejecting the slide, in order to break or "crack" any residual adhesive bond between edges of a slide and walls of the carrier. The specimen slides may be horizontally aligned and resting on a corresponding plurality of flat shelves, enabling even spacing via gravitational forces. The slides are therefore evenly spaced, enabling damage-free ejection of slides, and proper positioning for additional operations including scanning, viewing, heating, washing, and other processing. The label reader may process scanned information from the label of the slide to determine one or more attributes of the slide,
(Continued)

and to generate an order or sequence of operations to be thereafter performed on the slide.

19 Claims, 13 Drawing Sheets

Related U.S. Application Data continuation of application No. PCT/EP2015/064518, filed on Jun. 26, 2015.

(60) Provisional application No. 62/018,827, filed on Jun. 30, 2014.

(52) U.S. Cl.
CPC .......... *B01L 9/52* (2013.01); *G01N 2001/315* (2013.01); *G01N 2035/00059* (2013.01); *G01N 2035/00138* (2013.01); *G01N 35/0099* (2013.01); *Y10T 436/112499* (2015.01)

(58) Field of Classification Search
CPC .......... G01N 2035/00059; G01N 2035/00138; B01L 9/52; Y10T 436/112499
See application file for complete search history.

(56) References Cited

U.S. PATENT DOCUMENTS

| | | | |
|---|---|---|---|
| 6,847,481 | B1 | 1/2005 | Ludl et al. |
| 2006/0105359 | A1* | 5/2006 | Favuzzi .......... G01N 35/00871 |
| | | | 435/6.19 |
| 2007/0036264 | A1* | 2/2007 | Beyrard .................. A61B 6/04 |
| | | | 378/19 |
| 2008/0193333 | A1 | 8/2008 | Takahashi et al. |
| 2010/0254854 | A1 | 10/2010 | Rich et al. |
| 2012/0189412 | A1 | 7/2012 | Hoffmann et al. |
| 2014/0362436 | A1* | 12/2014 | Forget ................... G02B 21/26 |
| | | | 359/391 |

FOREIGN PATENT DOCUMENTS

| | | |
|---|---|---|
| CN | 102334085 A | 1/2012 |
| CN | 102680290 A | 9/2012 |
| CN | 202878610 U | 4/2013 |
| CN | 103175722 A | 6/2013 |
| CN | 103792655 A | 5/2014 |
| CN | 103884565 A | 6/2014 |
| EP | 1927860 A2 | 6/2008 |
| WO | 2004057307 A1 | 7/2004 |
| WO | 2008028835 | 3/2008 |
| WO | 2008/140742 A1 | 11/2008 |
| WO | 2010/078240 A1 | 7/2010 |

\* cited by examiner

AUTOMATED SPECIMEN PROCESSING SYSTEMS AND METHODS

CROSS-REFERENCE TO RELATED APPLICATIONS

This patent application is a continuation of U.S. patent application Ser. No. 15/385,863 filed on Dec. 21, 2016, which application is a continuation of International Patent Application No. PCT/EP2015/064518 filed Jun. 26, 2015, which claims priority to and the benefit of the filing date of U.S. Provisional Application No. U.S. 62/018,827, filed Jun. 30, 2014. Each of the above patent applications is incorporated herein by reference as if set forth in its entirety.

FIELD OF THE SUBJECT DISCLOSURE

The subject disclosure relates to systems for preparing specimens for analysis. In particular, the subject disclosure relates to specimen processing systems for processing specimen slides.

BACKGROUND OF THE SUBJECT DISCLOSURE

A wide variety of techniques have been developed to prepare and analyze biological specimens. Example techniques include microscopy, microarray analyses (e.g., protein and nucleic acid microarray analyses), and mass spectrometric methods. Specimens are prepared for analysis by applying one or more liquids to the specimens. If a specimen is treated with multiple liquids, both the application and the subsequent removal of each of the liquids can be important for producing samples suitable for analysis. Microscope slides bearing biological specimens, e.g., tissue sections or cells, are often treated with one or more dyes or reagents to add color and contrast to otherwise transparent or invisible cells or cell components. Specimens can be prepared for analysis by manually applying dyes or other reagents to specimen-bearing slides. Automated machines immerse specimens in liquids by a technique similar to manual immersing techniques. These automated machines can process specimens in batches by submerging racks carrying microscope slides in open baths.

Unfortunately, there are numerous issues with existing systems. Carryover of liquids between containers leads to contamination and degradation of the processing liquids. Further, slide carriers may have undergone externally processing such as drying and deparaffinization. The heat from these processes causes wax on the slides to melt and make contact with the slide carrier. After cooling, the wax hardens to create a bond between the slide and the slide carrier, which hinders ejection of slides from the slide carrier for subsequent processing. Worse, the slides may be misaligned based on how they were oriented when the wax is dried. If the slides are misaligned, subsequent processes such as imaging, etc. are hindered. Moreover, current automated staining systems rely on manual loading of slides onto individual platforms. Some of these systems require a user to manually map the location of each slide in the system. There is no currently optimized method for removing the adhesive bond between the slide and the slide carrier, individually ejecting slides in an aligned fashion, and automatically processing each slide based on the contents of its label.

SUMMARY OF THE SUBJECT DISCLOSURE

The exemplary embodiments described herein include systems and methods for processing a specimen slide using a specimen processing system. Generally, a specimen slide may be ejected from a slide carrier towards a staging device. The specimen slide may be one of a plurality of specimen slides carried by the slide carrier, and each specimen slide may be horizontally aligned and resting on a corresponding plurality of flat shelves, enabling optimal alignment via gravitational forces, as further described herein. The slides are therefore evenly spaced, enabling damage-free ejection of slides, and proper positioning for additional operations including scanning, viewing, heating, washing, and other processing. The slide may be ejected using a slide ejector that engages an ejector element or "finger" with the slide to push the slide onto a slide holding region of the staging device. For instance, the staging device may include a standby platform and an over-travel inhibitor, and a vacuum may be drawn through the over-travel inhibitor to stop forward movement of the slide on the slide holding region. The specimen-bearing microscope slides can be sequentially moved from the carrier to the slide staging device by indexing the shelves at a slide removal position adjacent to a platform of the slide staging device. A presence of the slide may be detected on the holding region by a controller via a plurality of sensors. For instance, the presence of the slide may be detected by changes in the vacuum suction of the over-travel inhibitor, changes in pressure within the vacuum port, fluid lines and/or vacuum sources, as well as other sensors including pressure sensors, optical sensors, motion sensors, etc.

Once ejected, an alignment of the slide may be further corrected from a misaligned position to an aligned position using, for instance, a plurality of aligning members that are coupled to a corresponding plurality of actuators adjacent the holding region. The aligning members may engage the slide to move the slide to an aligned position and, following alignment of the slide, the actuators can move the aligning members back to a starting position and away from the aligned slide. Once properly aligned, the slide may be transported to one or more processing stations. The side may be transported from the standby platform to, for example, a specimen processing station while maintaining alignment of the slide. A transport assembly having a transfer head may be aligned with the standby platform via a plurality of head alignment features. The transfer head may be configured to engage, pick up and transport the slide using a capture feature such as, for instance, a vacuum provided by a vacuum source.

In exemplary embodiments, a cracking element may be engaged with the slide carrier prior to ejecting the slide, in order to break or "crack" the residual adhesive bond between edges of a slide and walls of the carrier described in the Background. For instance, the system may be programmed to "dry" the slides within a rack, thereby causing a wax residue between the slide and the carrier walls to harden, and creating an adhesive bond. The slides may be improperly aligned when this bond is sealed. Any subsequent ejection mechanism may cause damage to the slide. Therefore the subject disclosure introduces a cracking element that is significantly wider than the ejector element, and actuating the cracking element towards the slide rack to break or crack bonds between one or more slides and the walls of their respective shelf or "slot" within the slide rack. The wide cracking element may be sufficiently sized to crack the adhesive bond of all the slides within a rack, or any number of slides within the rack. Then, a narrow ejector element may be engaged to eject a single slide among the plurality of cracked slides having their bonds broken.

In exemplary embodiments, the slide may be ejected onto a staging device positioned adjacent a label reader or scanner. The label reader or scanner may process scanned information from a label of the slide to determine one or more attributes of the slide, and to generate an order or sequence of operations to be thereafter performed on the slide. For instance, a processor coupled to the reader may correlate the one or more attributes of the slide with a database to retrieve instructions on how the slide is intended to be processed. The reading of the label allows software stored on a memory coupled to the processor to instruct the processor to determine what assays are to be executed, and to determine if the proper reagents are on board the system. The automated specimen processing system may include a controller communicatively coupled to the slide ejector assembly. The controller, for example, can be programmed to command the slide alignment device. For instance, the controller may be programmed to control a transfer head to align with the slide staging device and to transport the slide from the standby to a specimen processing station. The controller may perform operations based on the processing instructions determined by the processor as a result of reading or scanning a label of the slide.

Once scanned, the slide may be placed back into the slide carrier by an opposing ejector element or "pusher element" that is actuated to guide or push the slide back into its corresponding slot of the slide carrier. Optionally, the scanner may be moved aside, and one or more subsequent viewing or processing operations may be performed on the slide prior to its return to the slide carrier. Eventually, the slide is returned to the slide carrier, and the slide carrier may be transported to other areas of the specimen processing station as further described herein.

DETAILED DESCRIPTION OF THE SUBJECT DISCLOSURE

Figure 1:
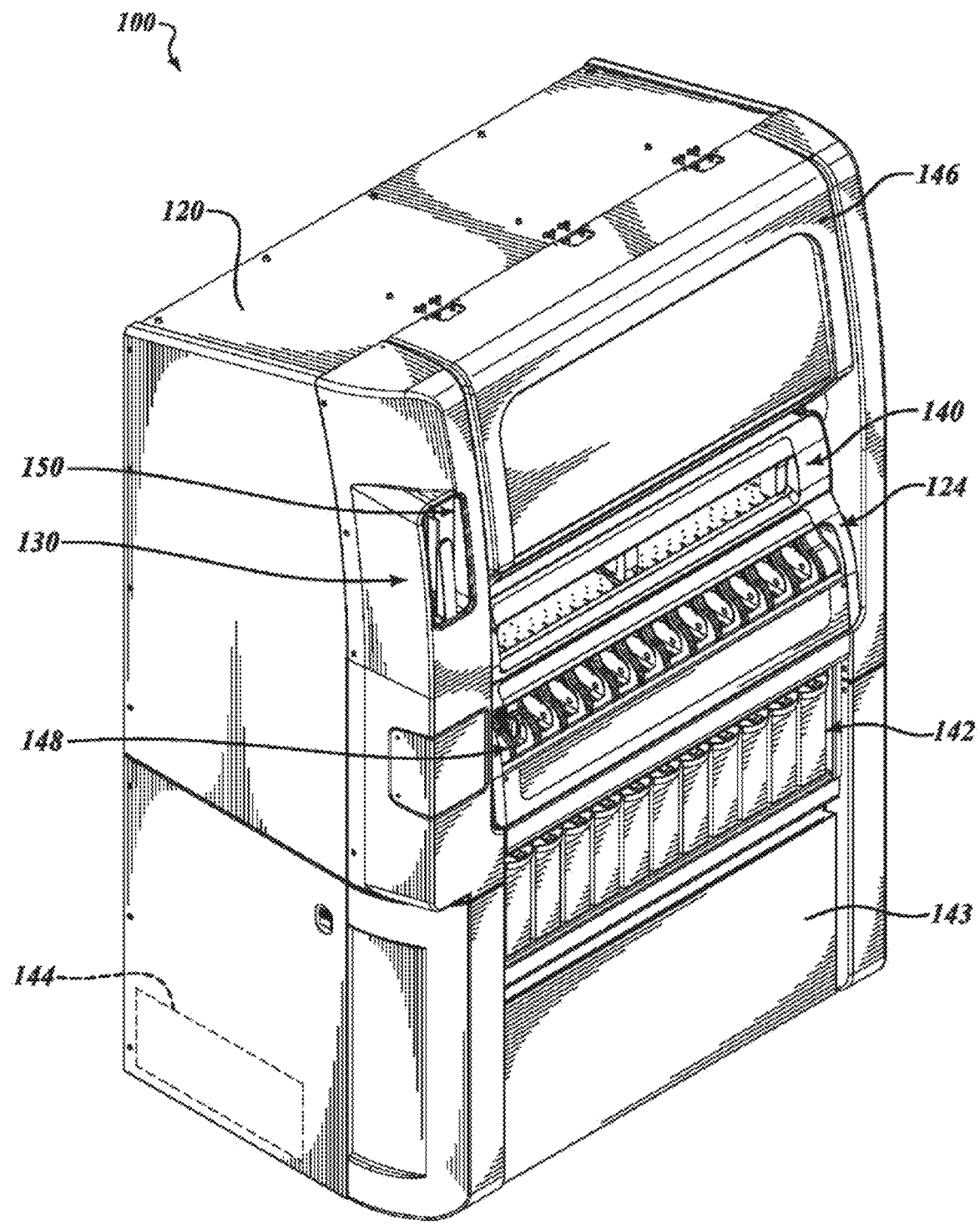
FIG. 1 shows a specimen processing system, according to an exemplary embodiment of the subject disclosure.

The exemplary embodiments described herein include systems and methods for processing a specimen slide using a specimen processing system, described below with reference to FIGS. 1-13, and described in further detail in commonly-assigned and co-pending U.S. patent application Ser. No. 13/831,255, the contents of which are hereby incorporated by reference herein in their entirety.

Generally, a specimen slide may be ejected from a slide carrier towards a staging device. The specimen slide may be one of a plurality of specimen slides carried by the slide carrier, and each specimen slide may be horizontally aligned and resting on a corresponding plurality of flat surfaces or "slots", enabling optimal alignment via gravitational forces, as further described herein. The slides are therefore evenly spaced, enabling damage-free ejection of slides. The optimal alignment is used to properly position the slides for additional operations including scanning, viewing, heating, washing, and other processing. The slide may be ejected using a slide ejector that engages an ejector element or "finger" with the slide to push the slide onto a slide holding region of the staging device. For instance, the staging device may include a standby platform and an over-travel inhibitor, and a vacuum may be drawn through the over-travel inhibitor to stop forward movement of the slide on the slide holding region. A presence of the slide may be detected on the holding region by a controller via a plurality of sensors. For instance, the presence of the slide may be detected by changes in the vacuum suction of the over-travel inhibitor, changes in pressure within the vacuum port, fluid lines and/or vacuum sources, as well as other sensors including pressure sensors, light sensors, motion sensors, etc.

Once ejected, an alignment of the slide may be further corrected from a misaligned position to an aligned position using, for instance, a plurality of aligning members that are coupled to a corresponding plurality of actuators adjacent the holding region. The aligning members may engage the slide to move the slide to an aligned position and, following alignment of the slide, the actuators can move the aligning members back to a starting position and away from the aligned slide. Once properly aligned, the slide may be transported to one or more processing stations. The slide may be transported from the standby platform to, for example, a specimen processing station while maintaining alignment of the slide. A transport assembly having a transfer head may be aligned with the standby platform via a plurality of head alignment features. The transfer head may be configured to engage, pick up and transport the slide using a capture feature such as, for instance, a vacuum provided by a vacuum source.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a specimen processing system 100 comprising a protective housing 120, a slide carrier parking station 124, an opposable carrier loading station 130, and reagent parking stations 140, 142. System 100 can automatically process specimen-bearing slides using opposables loaded via the loading station 130 to perform, for example, specimen conditioning (e.g., cell conditioning, washing, deparaffinizing, etc.), antigen retrieval, staining (e.g., H&E staining), or other types of protocols (e.g., immunohistochemistry protocols, in situ hybridization protocols, etc.) for preparing specimens for visual inspection, fluorescent visualization, microscopy, microanalyses, mass spectrometric methods, imaging (e.g., digital imaging), or other analytical or imaging methods. System 100 can simultaneously process 20 specimen-bearing slides using the same or different protocols to provide processing flexibility and a relatively high throughput. The specimens can remain on the slides throughout processing (e.g., baking through staining) for convenient handling and preventing cross-contamination. The staining and processing protocols for each slide may be determined by scanning a label on each individual slide as further described herein.

Moreover, a biological specimen can include one or more biological samples. Biological samples can be a tissue sample or samples (e.g., any collection of cells) removed from a subject. The tissue sample can be a collection of interconnected cells that perform a similar function within an organism. A biological sample can also be any solid or fluid sample obtained from, excreted by, or secreted by any living organism, including, without limitation, single-celled organisms, such as bacteria, yeast, protozoans, and amoebas, multicellular organisms (such as plants or animals, including samples from a healthy or apparently healthy human subject or a human patient affected by a condition or disease to be diagnosed or investigated, such as cancer). In some embodiments, a biological sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample.

The protective housing 120 inhibits, limits, or substantially prevents contaminants from entering an internal processing environment. The protective housing 120 can include a cover 146 that can be opened to access internal components, including, without limitation, imaging devices (e.g., label scanners, barcode readers, cameras, etc.), robotic components (e.g., robotic arms), transport devices (e.g., conveyors, actuators, etc.), fluidic components, specimen processing stations, slide platens, mixing components (e.g., mixing wells, reagent trays, etc.), slide carrier handling components, opposable carrier handling components, dryers, pressurization devices (e.g., pumps, vacuum devices, etc.), or the like. The parking station 124 includes a row of bays. A slide carrier in the form of a basket is positioned in a left bay 148. Each bay can be configured to receive other types of slide carriers, such as racks, baskets, trays, or other types of carriers suitable for carrying slides before, during, or after specimen processing. The illustrated parking station 124 includes 12 bays separated by dividers. The number of bays, positions of bays, bay orientations, and bay configurations can be selected based on the types of slide carriers to be used.

The loading station 130 includes a receiving opening 150 through which a user can load an opposable carrier. The opposable carrier can be a magazine that holds a stack of opposable elements. In other embodiments, the opposable carriers can be cartridges, or other portable structures for carrying opposables. The parking stations 140, 142 each include a row of bays. Each bay can hold one or more containers, including bulk reagent containers, bottles, bag-in-box reagent containers, or the like. The parking station 142 can hold bulk liquid containers that provide liquids used in larger volumes, such as wash solutions. Empty containers in the parking stations 140, 142 can be conveniently replaced with full containers. Fluid movement into, out of, and within specimen processing stations can be controlled by a fluidics module that includes, for example, pumps, valves, and filters. A pneumatics module can supply pressurized air and generate vacuums to perform various slide processing operations and to move fluids throughout the system 100. Waste can be delivered to a waste drawer 143. The waste drawer 143 holds waste containers 149A, 149B (see FIG. 2). The pneumatics module can deliver waste from the specimen processing stations to the containers 149A, 149B, which can be emptied periodically.

A controller 144 can command system components and can generally include, without limitation, one or more computers, central processing units, processing devices, microprocessors, digital signal processors (DSPs), application-specific integrated circuits (ASICs), readers, and the like. To store information, the controller 144 can include, without limitation, one or more storage elements, such as volatile memory, non-volatile memory, read-only memory (ROM), random access memory (RAM), or the like. The stored information can include heating programs, optimization programs, tissue preparation programs, calibration programs, indexing programs, mixing programs, or other executable programs.

Moreover, as described herein, reading or scanning a label or barcode of each slide may trigger software-generated staining protocols and other operations according to predetermined sequences.

For instance, optimization programs can be executed to optimize performance (e.g., enhance heating, reduce excess reagent consumption, increase productivity, enhance processing consistency, or the like) based on an identifier or attribute of the slides in the carrier. The processing may be optimized by determining, for example, an optimum schedule to (1) increase processing speeds, (2) reduce the time of heating or cooling cycles, (3) increase throughput (e.g., increase the number of slides processed in a certain length of time), and/or (4) reduce reagent waste. In some embodiments, the controller 144 determines loading sequences for loading the specimen processing stations to reduce processing times and to determine loading sequences of the dispensers. This saves time because fluids can be dispensed onto the next specimen-bearing slide as soon as a specimen-bearing slide is removed from the specimen processing station. In some embodiments, the controller 144 determines sequences for mixing and dispensing reagent using the mixing station 165.

The controller can receive slide information from a reader (not shown) that obtains slide information (e.g., a target processing temperature, a target processing temperature range, replenishing rate, etc.) from a label of a slide. With the target processing temperature or target processing temperature range and a total evaporation rate, the controller 144 can determine a target range of equilibrium volumes. The controller 144 can receive additional information such as a total evaporation rate, look-up tables, temperature set points, duty cycles, power settings, environmental information such as ambient temperatures and/or humidity, processing protocols, etc. A processor on the controller or reader may be programmed to read a label or barcode of a slide and communicate with a data server or other similar device in order to retrieve information from a database based on the label. The memory can store different instructions for different processes, including contacting the specimen with a wash, applying a reagent (e.g., a stain) to the specimen, heating and cooling the slide to one or more target temperatures for different processes, etc. The controller may receive the information and execute a plurality of instructions stored in the memory that enable various components of the automated specimen processing system to perform operations that are optimized for the slide based on the label.

Figure 2:
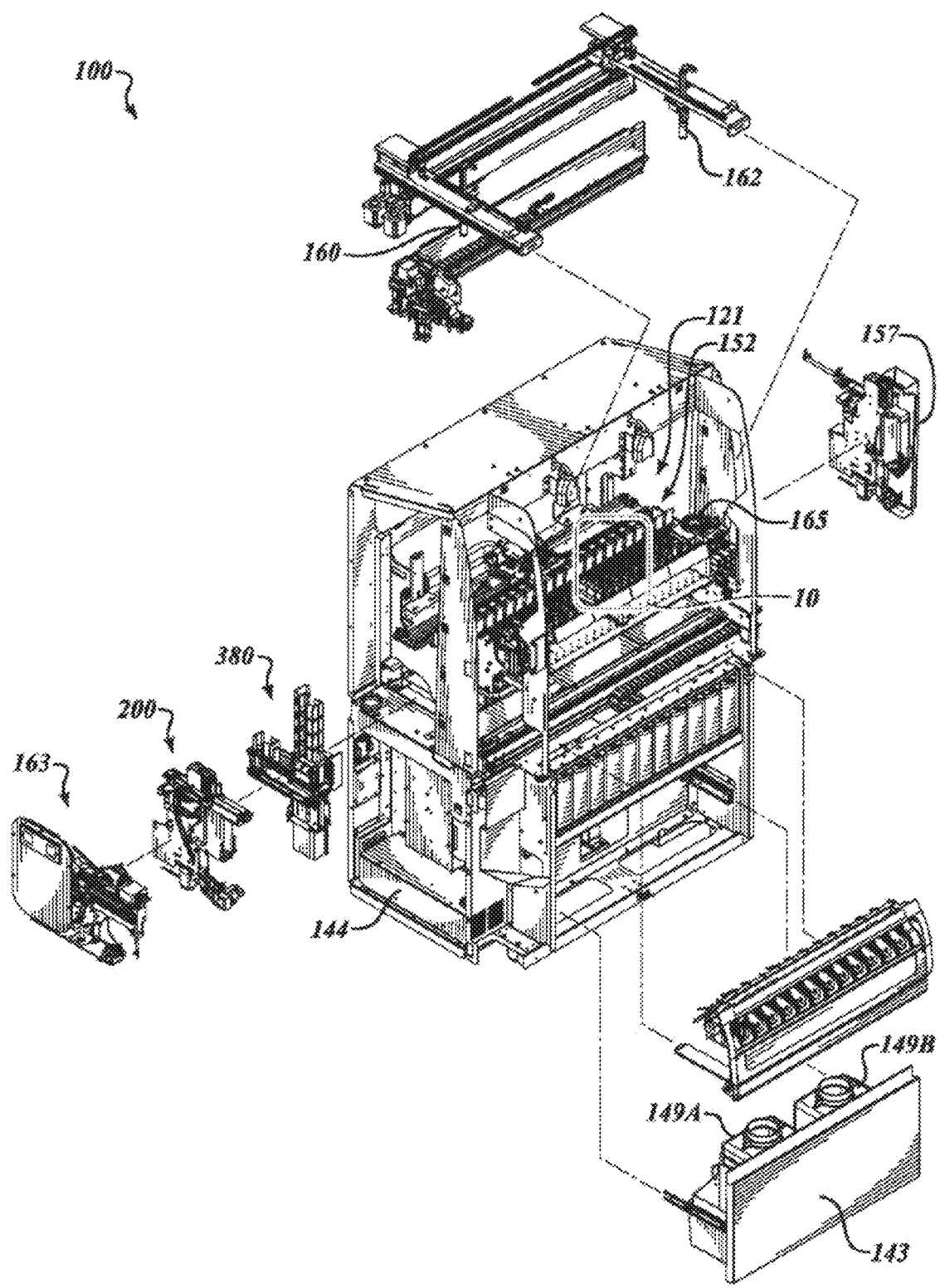
FIG. 2 shows an isometric exploded view of the specimen processing system, according to an exemplary embodiment of the subject disclosure.

FIG. 2 is an isometric exploded view of the specimen processing system 100 including a processing station 163, a slide ejector assembly 200, an opposable dispenser 380, and a specimen return mechanism 157. The processing station 163, the slide ejector assembly 200, and the opposable dispenser 380 are positioned at the left side of an internal environment 121. The specimen return mechanism 157 is positioned at the right side of the internal environment 121. A mixing station 165 is positioned generally below the specimen return mechanism 157 and can include reservoirs (e.g., reservoir wells). Reagents can be mixed in the mixing station 165. In other embodiments, the mixing station 165 can hold containers (e.g., vials, beakers, etc.) in which substances are stored and/or mixed. A row 152 of 20 specimen processing stations can independently process biological specimens.

In operation, a user can load slide carriers carrying specimen-bearing slides into the empty bays of the parking station 124 of FIG. 1 and can load opposable carriers carrying opposables into the loading station 130. The slide carriers can be transferred to a reader (e.g., a label reader, a barcode reader, etc.), not shown that reads labels, if any, on the slides. Each slide may be ejected from the slide carrier towards a label reader, and then moved back into the slide carrier. The label information for each slide may be communicated to a processor for a determination of attributes and sequences of operations that are intended to be performed on the slide. Some of these operations may be performed by additional units or modules within specimen processing system 100. For instance, the slide carriers can be delivered to the processing station 163 which can include, without limitation, a dryer (e.g., a dehydration unit), a heating unit (e.g., a baking module), or other component capable of removing water from the slides, heating specimens (e.g., heating specimens to adhere the specimens to the slides), or the like. In some embodiments, the processing station 163 blows hot air over slides to dry the slides, and if the specimens contain paraffin, the hot air can soften the paraffin to promote adhesion of the specimens to the slides. An air system can partially recirculate air to control the humidity in the processing station 163. Slide carriers can be picked up and transported from the processing station 163 to another module (e.g., a specimen processing station, a label reader, etc.) or returned to one of the bays of the parking station 124.

The specimen return mechanism 157 can load specimen-bearing slides into a slide carrier. The loaded slide carriers can be transported to the parking station 124. If the slide carriers are compatible with an automated coverslipper, the slide carriers may be transported from the parking station 124 to an automated coverslipper for coverslipping. Alternatively, the slides can be manually coverslipped. The coverslipped slides can be analyzed using optical equipment, e.g., a microscope or other optical devices. For instance, coverslipped slides may be ejected from the slide carrier to a label reader for a determination of how to process the slide, and subsequently guided back into the slide carrier for subsequent processing. Moreover, any adhesion caused by wax melting during heating of the slide, whether performed external to the system or within the system, may be broken by cracker elements prior to ejection of slides, as further described herein.

Figure 3:
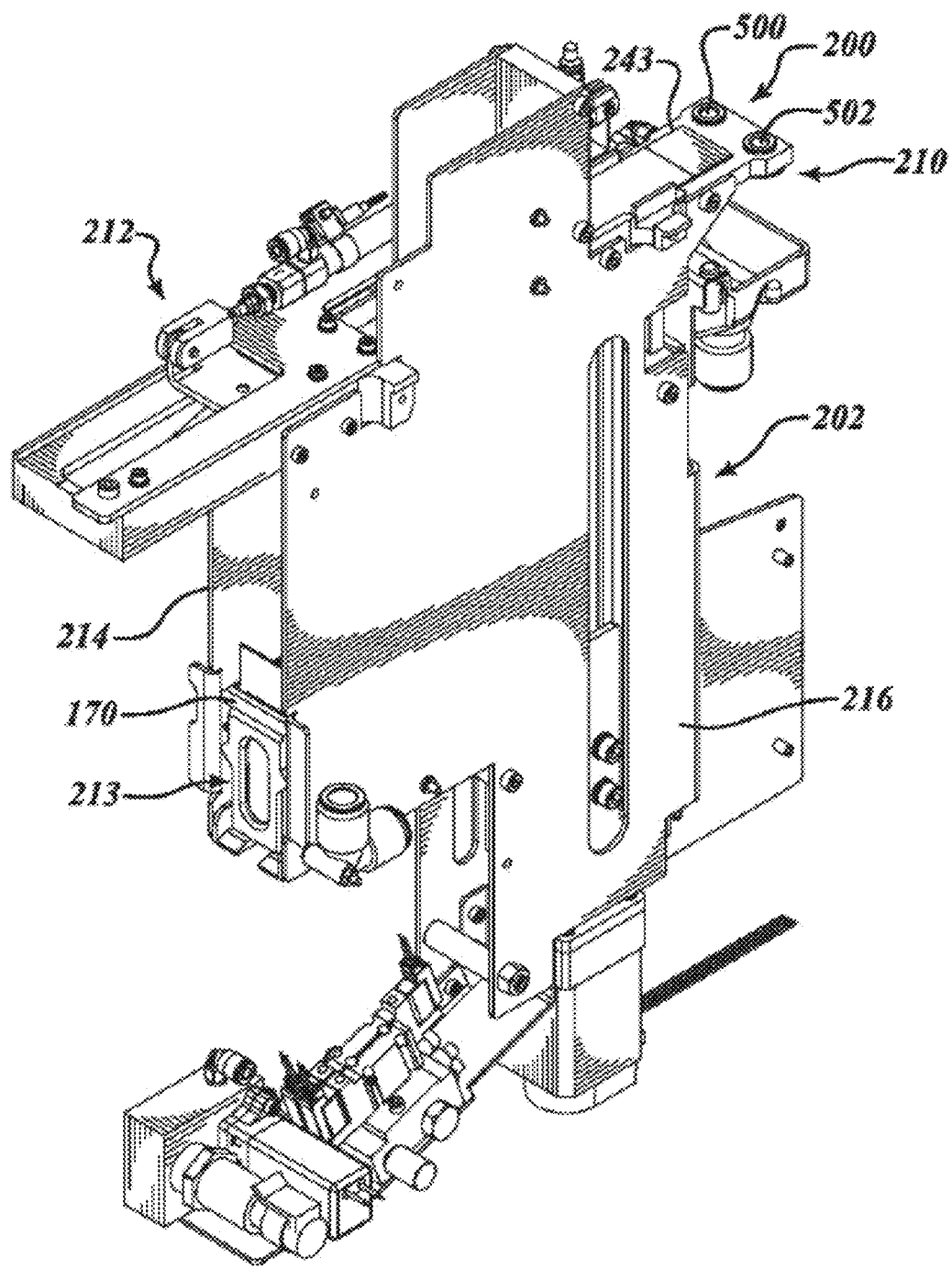
FIG. 3 shows an ejector assembly, according to an exemplary embodiment of the subject disclosure.
Figure 4:
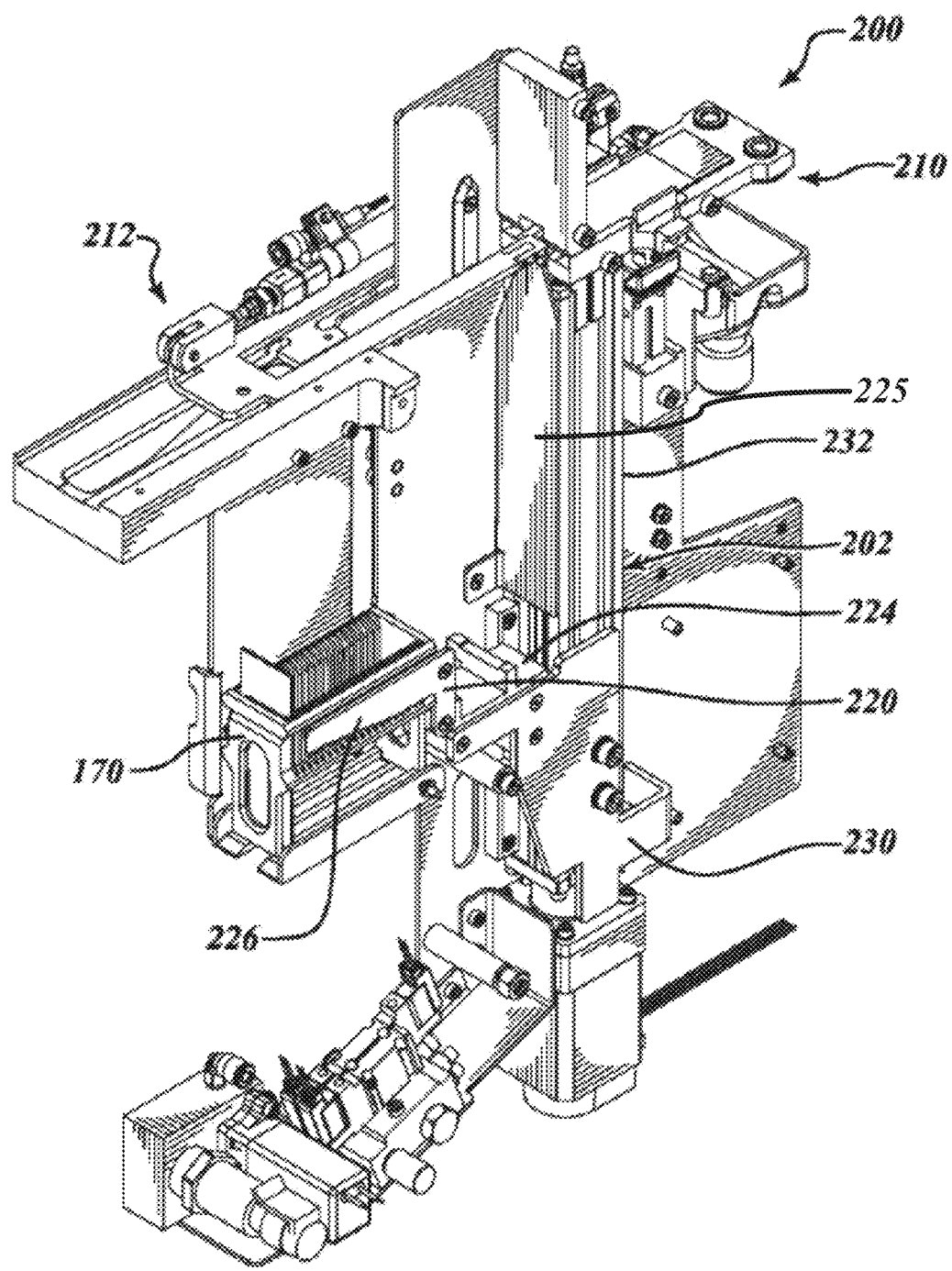
FIG. 4 shows components of an ejector assembly, according to an exemplary embodiment of the subject disclosure.
Figure 5:
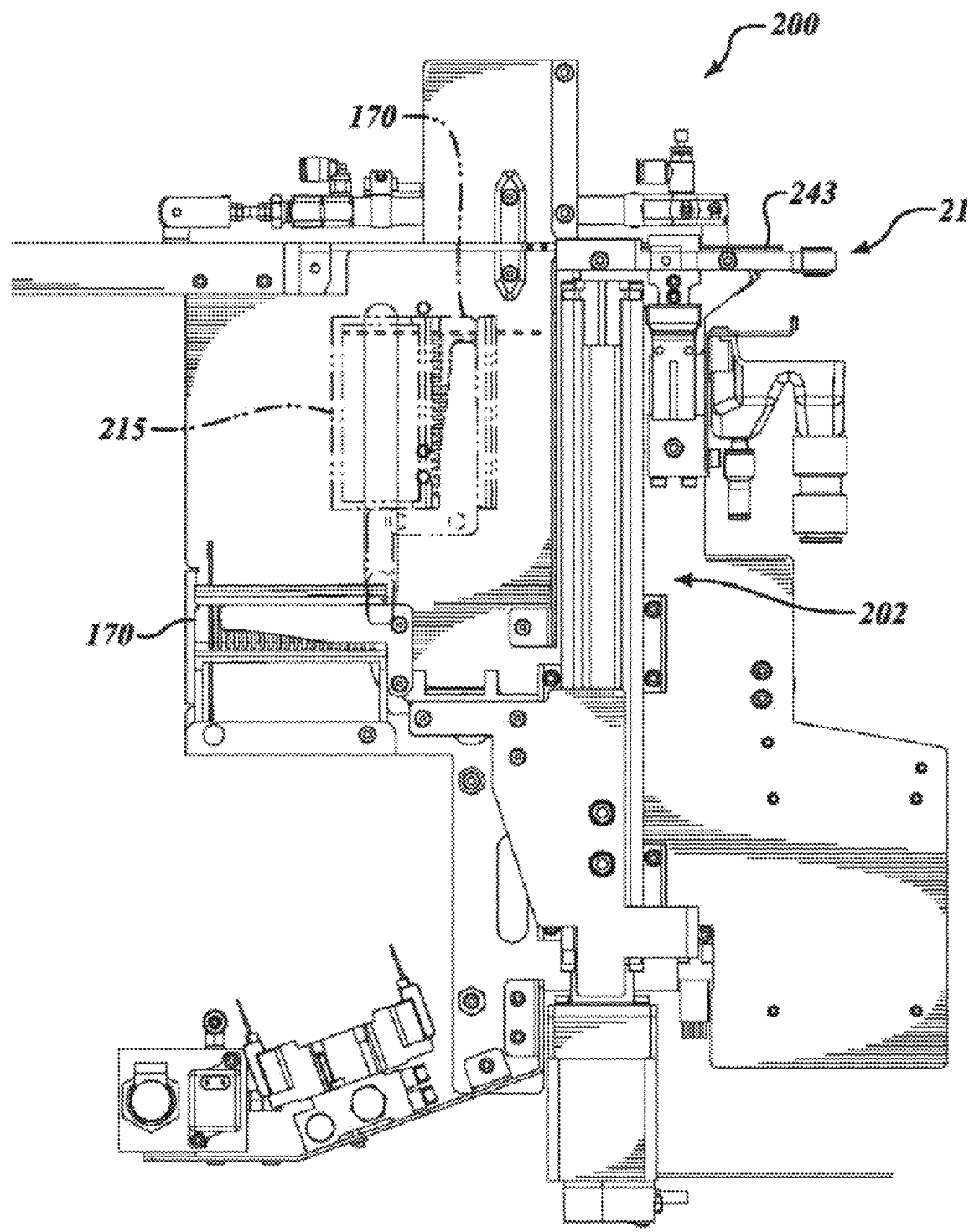
FIG. 5 shows a slide carrier in an intermediate position in an ejector assembly, according to an exemplary embodiment of the subject disclosure.

FIGS. 3 and 4 show a slide carrier 170 loaded into a slide ejector assembly 200 ("ejector assembly 200"). A plate 216 of FIG. 3 is shown removed in FIG. 4. The ejector assembly 200 includes a slide carrier handler 202 ("carrier handler 202"), a slide staging device 210 ("staging device 210"), and an ejector 212. The carrier handler 202 can include a carrier receiver 220 (FIG. 4) and a receiver rotator device 224 (FIG. 4). The carrier receiver 220 includes a pair of spaced apart arms 226 (e.g., elongate members, cantilevered members, etc.) upon which the slide carrier 170 can rest. The illustrated slide carrier 170 is a slide rack capable of holding microscope slides in a spaced-apart arrangement. One slide is shown in the carrier 170 of FIGS. 3 and 4. In some embodiments, the slide carrier 170 can be a basket, such as a SAKURA® basket or similar basket with shelves or dividers.

The carrier receiver 220 of FIG. 4 can include one or more grippers, clamps, retainers, or other components that releasably hold slide carriers. The receiver rotator device 224 can include, without limitation, one or more motors, actuation devices, or other components capable of rotating the arms 226. The arms 226 can move along an arcuate track, a pivoting mechanism, or the like to rotate the slide carrier 170. The carrier handler 202 can further include a carriage 230 and a rail 232. The carriage 230 can travel along the rail 232 to move the slide carrier 170 vertically. Further, one or more slide guidance features 225 may be incorporated into carriage 230, nearby or adjacent rail 232, to prevent incorrect jettisoning of slides due to momentum generated in the transition from vertical slides to horizontal slides.

Figure 6:
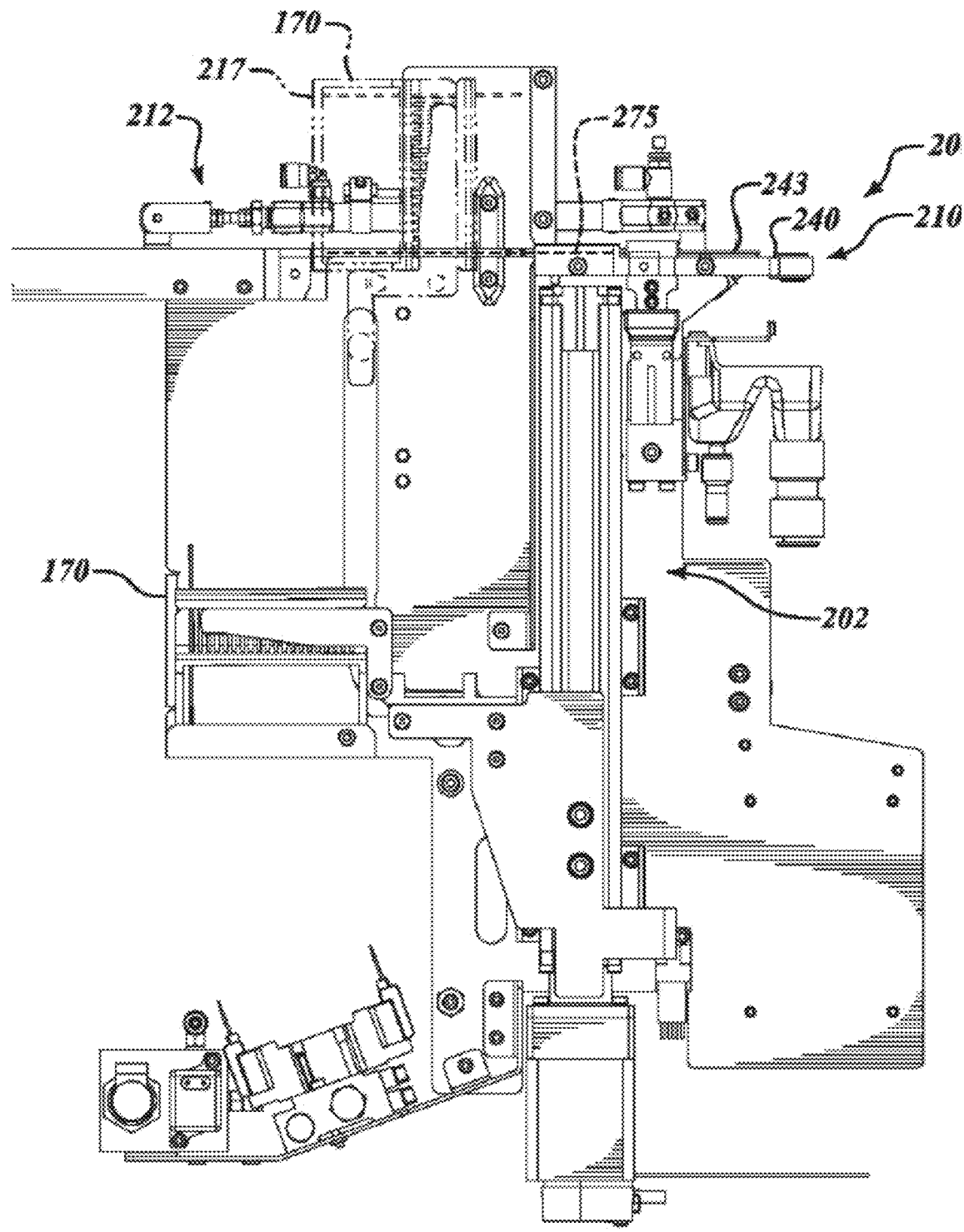
FIG. 6 shows a slide carrier in a horizontally-aligned position in an ejector assembly, according to an exemplary embodiment of the subject disclosure.

Referring again to FIG. 3, a fully or partially loaded slide carrier can be inserted between the plates 214, 216. The receiver rotator device 224 (FIG. 4) can rotate the carrier receiver 220 from a loading position 213 (FIG. 3) in which slides are held in a substantially vertical orientation to an intermediate position 215 (FIG. 5) in which slides are held in a substantially horizontal orientation. The term "substantially horizontal" generally refers to an angle within about +/−3 degrees of horizontal, for example, within about +/−1 degree of horizontal, such as within about +/−0.8 degrees of horizontal. The slide carrier 170 can be moved vertically to an unloading position 217 (FIG. 6). The unloading position 217 holds the slides horizontally, allowing the slide to rest on a flat surface of its respective shelf within slide carrier 170, enabling the slide to be properly aligned with respect to a flat surface of a staging device 210. The slides are therefore evenly spaced, enabling damage-free ejection of slides. The ejector 212 can sequentially move the specimen-bearing slides to the staging device 210, without any risk of damaging the tissue on the slide by the slide being misaligned. The staging device 210 can position the specimen-bearing slide for subsequent transport to other units of the system 100. Alternatively, the ejector 212 can sequentially eject individual slides by a specified distance to be scanned by a label reader or barcode scanner, and a pusher element can guide the slides back into the rack for subsequent processing. A cracker element may be engaged with the slides to break free any residual adhesive bonds caused by excess wax from a heating or drying operation. Moreover, the horizontal alignment of the slides enables proper alignment for ejection subsequent to using the wax cracking element to dislodge or to crack the bond between slides that are attached to the carrier 170.

Figure 7:
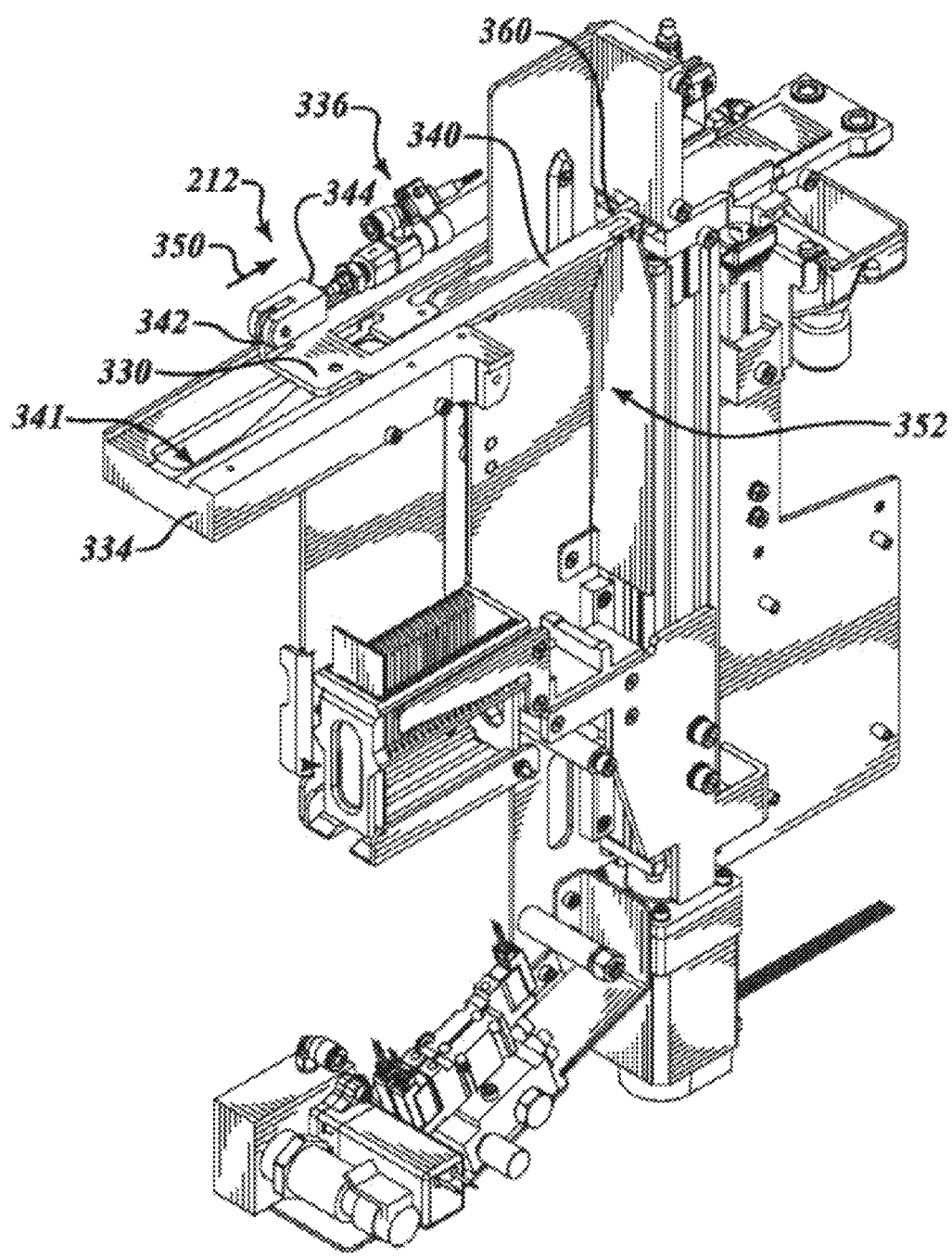
FIG. 7 shows components of an ejector in an ejector assembly, according to an exemplary embodiment of the subject disclosure.
Figure 8:
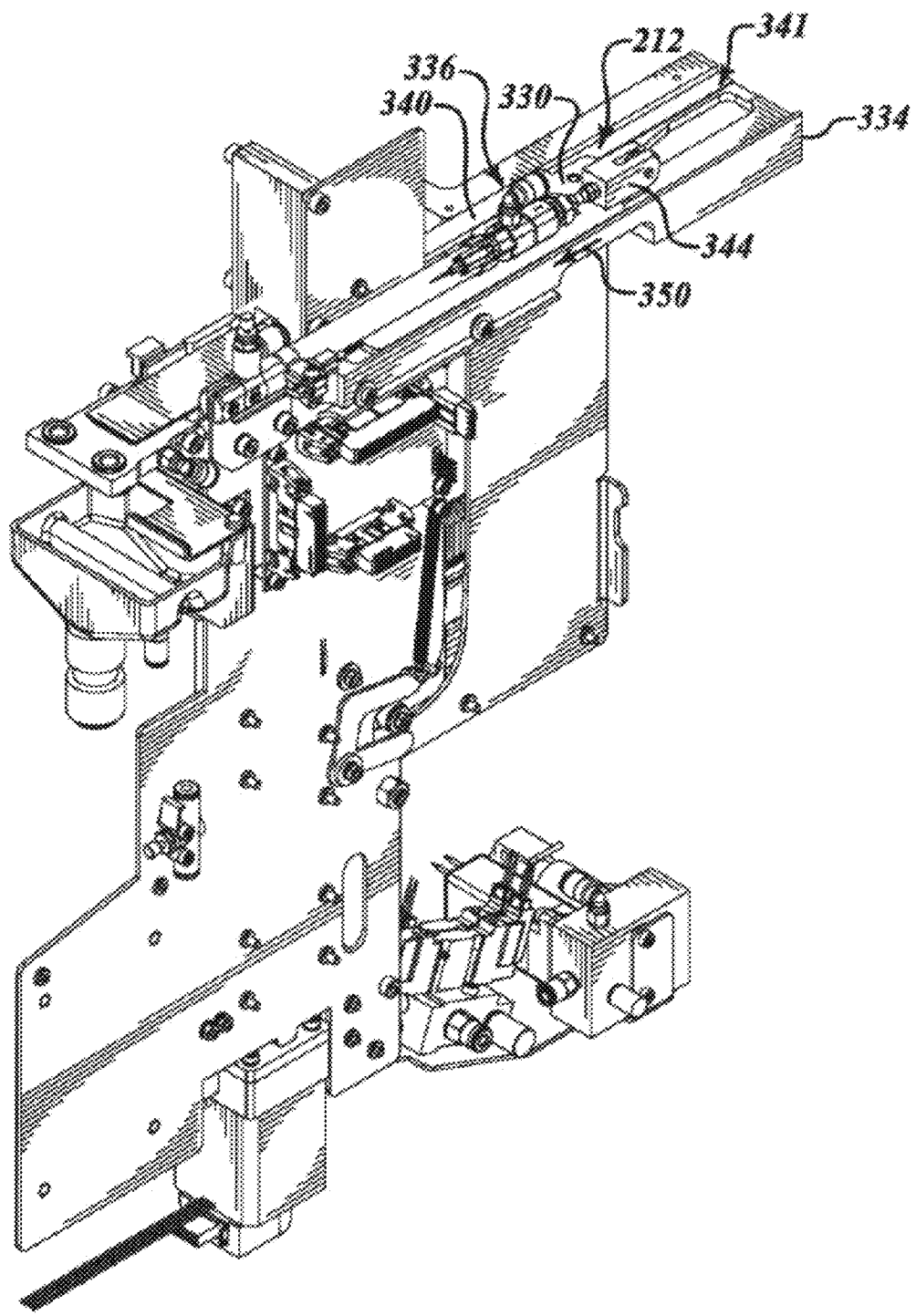
FIG. 8 shows an alternate view of the ejector, according to an exemplary embodiment of the subject disclosure.
Figure 9:
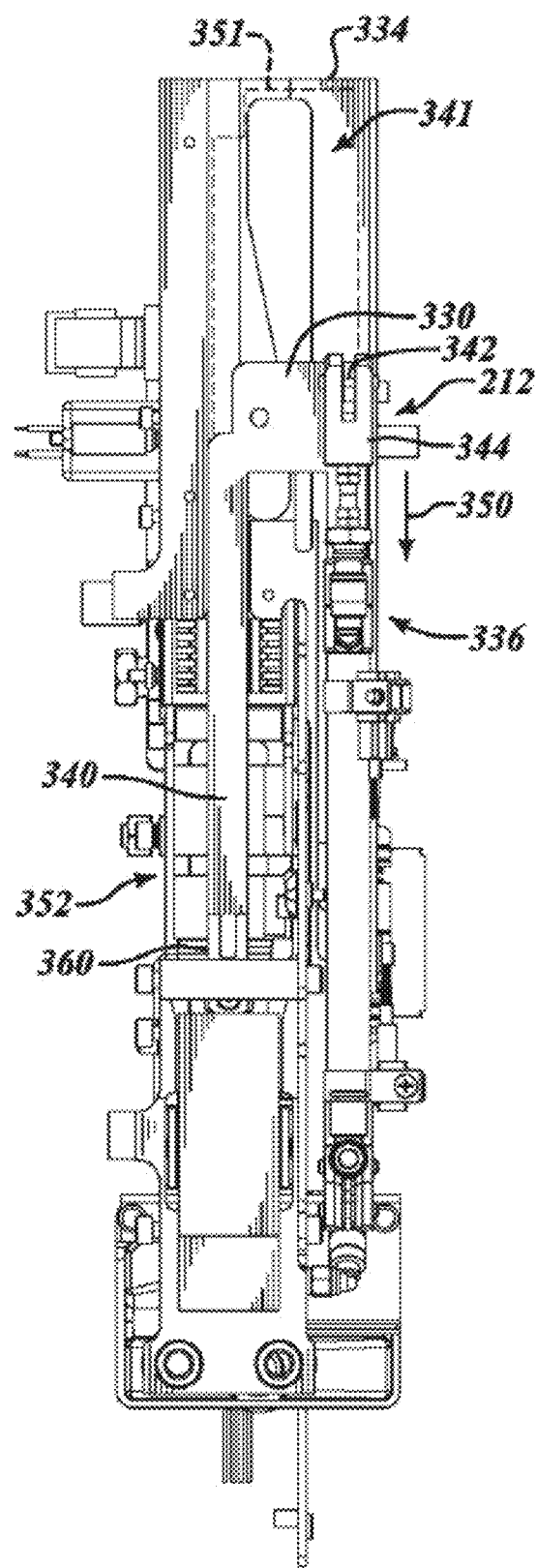
FIG. 9 shows a top view of the ejector, according to an exemplary embodiment of the subject disclosure.

FIGS. 7-9 show the ejector 212, which includes an ejector element 330, a base 334, and a drive mechanism 336. The ejector element 330 includes an elongate portion 340 positioned on a linear rail or other reduced friction device on the base 334 and a mounting portion 342 coupled to a rod 344 of the drive mechanism 336. The drive mechanism 336 can provide reciprocating linear motion and can comprise, without limitation, one or more stopper motors, pistons (e.g., pneumatic pistons, hydraulic pistons, etc.), pressurization devices (e.g., pumps, air compressors, etc.), sensors, or the like. The illustrated rod 344 has been moved in the direction indicated by arrow 350 to move the ejector element 330 from a first or initial position 351 (illustrated in phantom line in FIG. 9) across a slide carrier receiving gap 352 ("gap 352") such that a head 360 of the elongate portion 340 pushes a slide onto the standby platform 240. The head 360 can comprise a compliant material (e.g., rubber, plastic, etc.) to avoid damaging the slides. In some embodiments, the head 360 can push the slide along a surface of the holding region 250 until the slide is at the desired location. Slides can be removed from the slide carrier 170 one at a time until the slide carrier 170 is empty.

Referring again to FIGS. 1 and 2, a user can load a slide carrier holding specimen-bearing slides into the parking station 124. A transfer mechanism can transport the slide carrier to the ejector assembly 200. The transfer mechanism can include, without limitation, one or more robotic handlers or arms, X-Y-Z transport systems, conveyors, or other automated mechanisms capable of carrying items between locations. In some embodiments, the transfer mechanism includes one or more end effectors, grippers, suction devices, holders, clamps, or other components suitable for gripping the slide carrier. The ejector assembly 200 moves the slide carrier 170 to the unloading position 217 (FIG. 6). The slide carrier 170 is moved vertically to index slides relative to a reference position. The reference position can be a plane (e.g., a fixed slide removal plane 275 shown in FIG. 6) defining a slide removal position. A bottom of the slide to be removed can be generally coplanar or slightly above a surface of a staging device. The drive mechanism 336 can move the ejector element 330 horizontally to move the elongate portion 340 (FIG. 7) through the carrier 170 to push the slide out of the carrier. A second elongate portion (not shown) may be moved to crack or break a bond between the slide and the carrier prior to using elongate portion 340 to push the slide out. The second elongate portion or "cracking element" may be wider than elongate portion 340, and may be controlled by a separate actuator. One or more slides may be loosened from any adhesive bond with carrier 170, enabling elongate portion 340 to push individual slides out. Once pushed out and properly aligned, the slide 243 can be scanned by a label reader, processed, or transported to a specimen processing station. The drive mechanism 336 can move the ejector element 330 back and forth and the slides can be indexed to sequentially deliver all of the slides to the staging device 210 or to the label scanner further described herein.

To protect the specimens, the lowermost slide in the slide carrier 170 can be ejected first. By starting with the lowermost slide, the specimen(s) on the vertically adjacent slide can be facing away from the head 360 and therefore protected. If the head 360 is vertically misaligned with the slide to be removed, the head 360 may strike the bottom of the vertically adjacent slide without dislodging the specimen(s) on the upper surface of the vertically adjacent slide. After removing the lowermost slide, the lowermost slide left in the slide carrier 170 can be removed. This process can be repeated until the slide carrier 170 is empty. Other indexing sequences can be used to remove or scan the slides.

The empty slide carrier 170 can be returned to the loading position (FIG. 3) and then transported to one of the bays of the parking station 124. The empty slide carrier 170 can be removed from the parking station 124 and filled with specimen-bearing slides and returned to the parking station 124. Alternatively, the empty slide carrier 170 can be filled with processed specimen-bearing slides using the ejector assembly 200. A pusher assembly can be used to push processed specimen-bearing slides on the staging device 210 into a slide carrier. Thus, the ejector assembly 200 can be used to both unload and load slide carriers. The pusher assembly may be coupled to, for instance, a label scanner. The slide would then be pushed out of the carrier onto a staging device coupled to the label scanner, scanned, and then pushed back into the carrier using the pusher assembly.

In exemplary embodiments, the slide may be ejected onto a staging device coupled to a label reader or scanner. The label reader or scanner may process scanned information from a label of the slide. The scanned information may be used to confirm that the expected slide has been ejected, for instance, in the case where the label reader is a component of the slide/arc transfer module 160 in FIG. 2. In some embodiments, the scanned information may be used to determine one or more attributes of the slide, and to determine a processing protocol for the slide, or an order or sequence of operations to be thereafter performed on the slide, for instance, in the case of a scanner or label reader coupled to a "lookahead" module. For instance, a processor coupled to the reader may correlate the one or more attributes of the slide with a database to retrieve instructions on how the slide is intended to be processed. The reading of the label allows software stored on a memory coupled to the processor to instruct the processor to determine what assays are to be executed, and to determine if the proper reagents are on board the system, among other automated processes.

Figure 10:
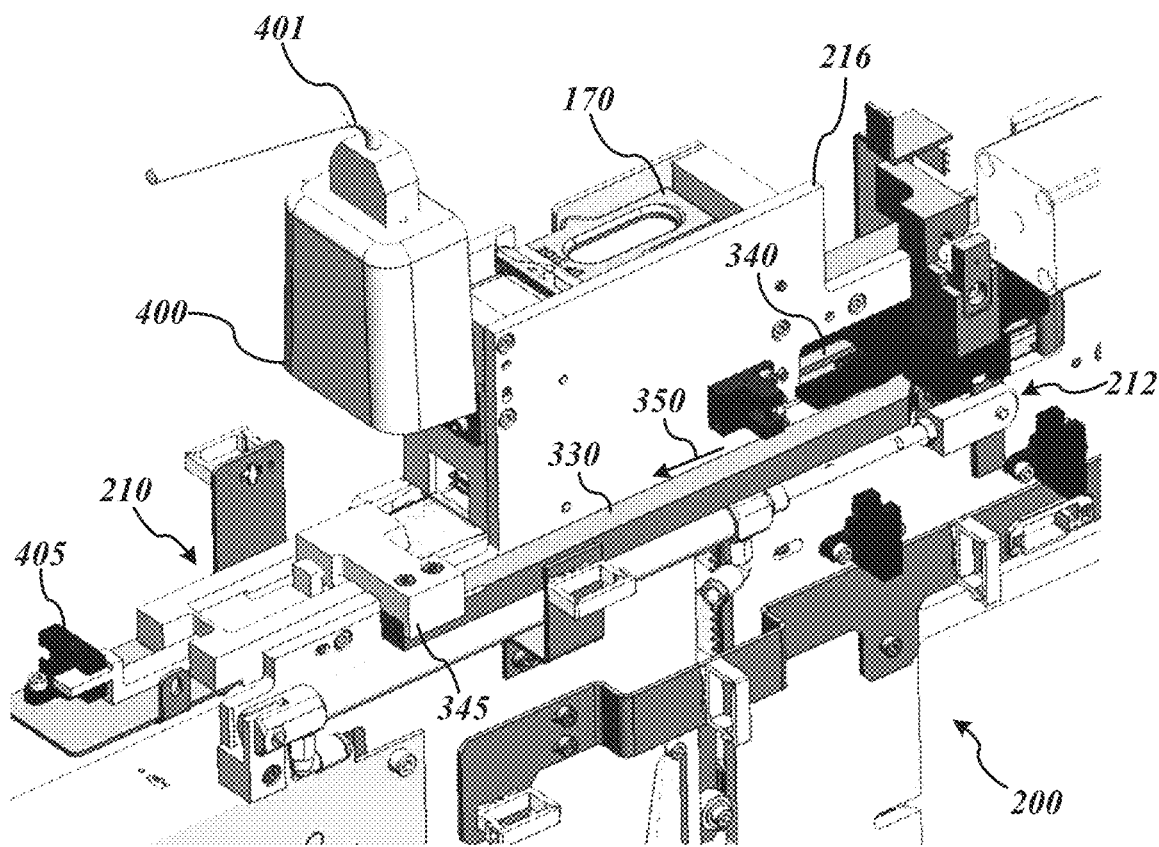
FIG. 10 shows a label reader coupled to a slide carrier and ejector assembly, according to an exemplary embodiment of the subject disclosure.
Figure 11:
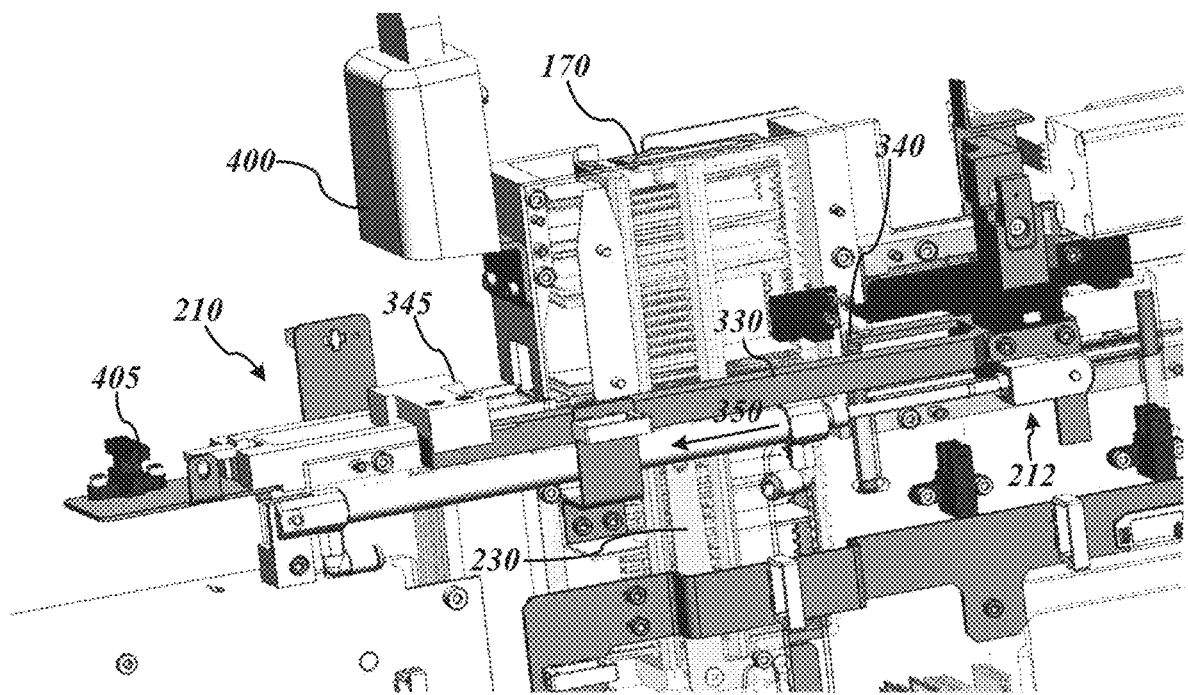
FIG. 11 shows another view of the label reader, according to an exemplary embodiment of the subject disclosure.

FIGS. 10 and 11 show a label reader 400 coupled to an specimen processing system, according to an exemplary embodiment of the subject disclosure. The slide may be pushed out to staging device 210 to be viewed by label reader 400. An optical sensor 405 may be used to determine whether or not the slide is optimally aligned, and alignment mechanisms may be used to optimally align the slide prior to being scanned by reader 400. Alternatively, the slide may be pushed out to a separate staging area coupled to or within reader 400. This separate staging area coupled to or within reader 400 can enable a "lookahead" feature that is used to determine assays and confirm on-board reagents, etc. Reader 400 may be in communication with a processor and a memory via interface 401. Upon reading the label, reader 400 may communicate information from the label, such as a slide identifier and other attributes, to the processor to determine a sequence of operations or processing protocol for the slide. The attributes may include an age of the slide, a specimen type, stain information, and other identifiable factors that may influence how the slide is intended to be processed. The slide may then be processed accordingly, either by being transported from staging device 210 to another unit of the system, or by being pushed back into the carrier 170 and subsequently processed. The slide may be pushed back into carrier 170 by pusher element 345, which may also be coupled to ejector element 330 and actuated by one or more actuators in ejector 212.

FIG. 11 shows another view of the label reader with the front plate 216 removed. As is visible in FIG. 11, a slide from carrier 170 may be pushed in a direction 350 by an elongate portion 340 of ejector element 330, until it is viewable by reader 400. The slide may be ejected onto a viewing platform of staging device 210, or into a separate platform enclosed within reader 400. The slide may be pushed back into carrier 170 from the platform of staging device 210 by pusher element 345 coupled to ejector element 330. The pusher element 345 may be actuated to guide or push the slide back into its corresponding slot of the slide carrier 170. Optionally, the scanner 400 may be moved aside, and one or more subsequent viewing or processing operations may be performed on the slide prior to its return to the slide carrier 170. Eventually, the slide is returned to the slide carrier 170, and the slide carrier 170 may be transported to other areas of the specimen processing station as further described herein. Alternatively, the slide may be transported separate from carrier 170 via a slide transport mechanism.

In exemplary embodiments, a cracking element may be engaged with the slide carrier prior to ejecting the slide, in order to break or "crack" the residual adhesive bond between edges of a slide and walls of the carrier described in the Background. For instance, a cracking element that is significantly wider than the ejector element may be actuated towards the slide rack to breaks or crack bonds between one or more slides in the slide rack. The wide ejector element may be sufficiently sized to crack the adhesive bond of all the slides within a rack, or any number of slides within the rack. Then, a narrow ejector element may be engaged to eject a single slide among the plurality of cracked slides having their bonds broken.

Figure 12A:
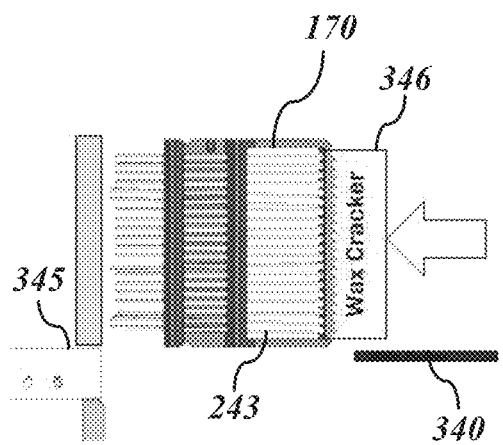
FIGS. 12A-D show a method for ejecting a slide from a slide carrier using a cracking element and an ejector element, according to an exemplary embodiment of the subject disclosure.

FIG. 12A-12D show a method for ejecting a slide from a slide carrier using a cracking element and an ejector element, according to an exemplary embodiment of the subject disclosure. A cracking element 346 and an elongate portion 340 of an ejector element are shown adjacent a slide carrier 170 containing slides 243 in a horizontally-aligned position, according to an exemplary embodiment of the subject disclosure. As mentioned herein, cracking element 346 may be sized sufficiently wide to impact one or more slides 243 in carrier 170 with sufficient force to break the adhesive bond that may exist as a result of melted wax adhering the slides 243 to carrier 170, for instance from a previously performed heating operation. FIG. 12A shows the cracking element 346 being moved in a direction towards slide rack 170, to break the wax bond between carrier 170 and slides 243. At this point, each slide 243 is properly horizontally aligned by virtue of the forces of gravity enabling it to rest on its respective shelf of carrier 170.

Figure 12B:
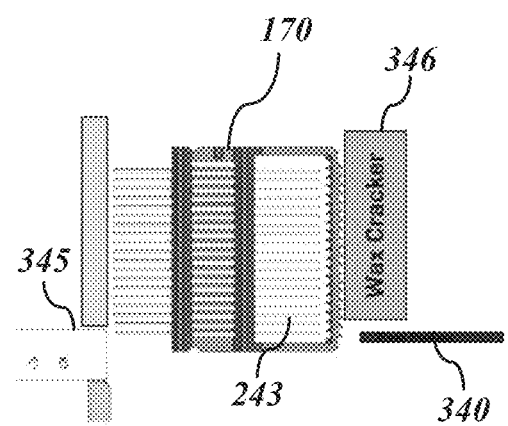
Figure 12C:
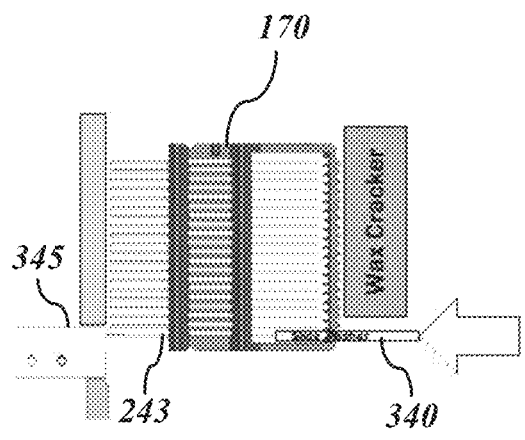
Figure 12D:
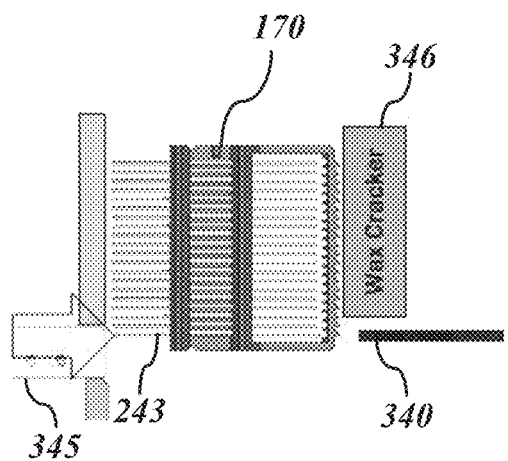

Subsequent to the cracking operation, FIG. 12B shows the carrier 170 being lowered to a position whereby the lowest slide 243 is properly aligned with a receiving area to the left of slide carrier 170, in order to be read by a label reader, or to perform other processes on slide 243. FIG. 12C shows elongate member 340 being actuated to engage and push single slide 243 out of carrier 170. Elongate member 340 is appropriately sized to engage only one slide at a time. Elongate member 340 may be moved back to its initial position. Subsequent to any imaging, scanning, or other operations, slide 243 may be guided back into its slot by pusher element 345. Pusher element 345 may be actuated by the same actuator that moves elements 346 and 340, by virtue of being coupled to the same ejector, or may be actuated by a separate actuator. Slide 243 is now in its original position, and rack 170 may be incrementally lowered to eject the next slide.

It generally takes a force of approximately 25 Newtons to break a single slide free of its wax bond. Although pushing multiple slides away from this adhesive bond ensures that the slides are evenly spaced and properly aligned due to gravity, this requires a large amount of force. For instance, breaking the bonds of 20 slides (i.e. an entire SAKURA® rack) would be 500 Newtons, or approximately 112 lbs. of force. Such a force may be higher than desirable for the actuators and other components of the system. Therefore, cracking elements of different thicknesses or widths may be used to break these bonds prior to ejecting the slides. Moreover, different actuating mechanisms may be employed to crack the bond versus ejecting slides. For instance, in some exemplary embodiments, cracking element 346 may be coupled to a motor-driven actuator, while elongate member 340 may be coupled to a pneumatic actuator.

Figure 13A:
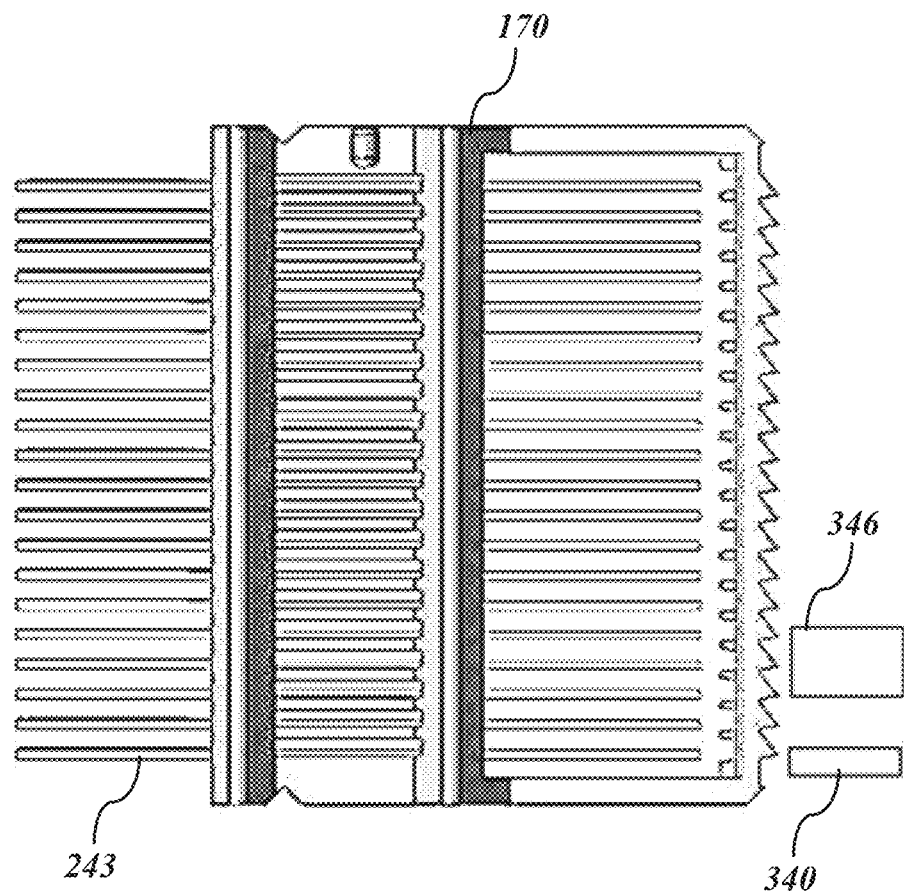
FIGS. 13A-C show differently shaped cracking elements, according to an exemplary embodiment of the subject disclosure.
Figure 13B:
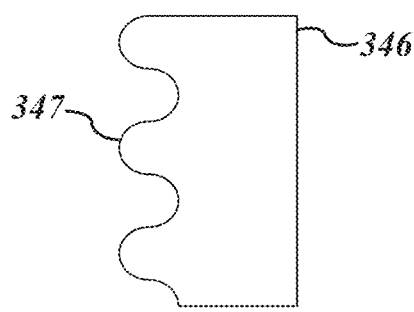
Figure 13C:
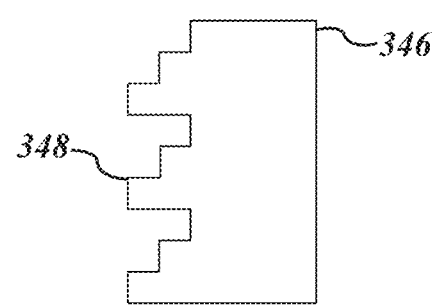

FIGS. 13A-C show differently-shaped cracking elements, according to exemplary embodiments of the subject disclosure. With the slide carrier 170 now horizontally aligned, potentially adhered slides are freed using a wide cracking element that is wide enough to break the bonds of three to four slides at a time. This reduces the overall force required to break the bonds. This process is then followed by the individual ejection of each slide 243 using elongate member 340, which engages one slide 243 at a time for operations such as label reading, bar code scanning, etc., for triggering software-generated staining protocols according to pre-determined user need. The slides may then be pushed back in by the pusher element, returning to their position to carrier 170, which may then be transported to other operations such as drying, heating, washing, or staining. Alternatively, the slide 243 may be individually transported after being ejected. If the carrier 170 is transported with all slides 243 in place, similar crack-and-eject mechanisms may be used to eject slides for subsequent operations.

FIGS. 13B and C show alternate shapes for cracking element 346. For instance, an undulating surface 347 enables breaking bonds of a plurality of slides 243, but not all the slides, thereby reducing the force necessary to break these bonds. A ridged surface 348 may offer more precision and cracking of multiple slides with a single push without using excessive force. The ridged surface 348 enables different sets of slides to be broken free from the slide carrier 170 at different depths, prior to eventual ejection by elongate member 340. The added advantage to surfaces 347 and 348 ensure that unnecessary vertical movement of the cracking element is minimized, thereby avoiding scratching the slide from an odd angle that is not perfectly in line with the horizontally aligned slide.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

The invention claimed is:

1. A method for processing a specimen, the method comprising:
    cracking an adhesive bond between a slide and a slide carrier with a cracking element by contacting the cracking element with at least one wall of the slide carrier with a force sufficient to crack the adhesive bond, wherein the cracking element has a cracking surface and is coupled to an actuator, and wherein the cracking element is movable by the actuator between a first position located adjacent to but not in contact with the at least one wall of the slide carrier and a second position in contact with the at least one wall of the slide carrier but not in contact with the slide;
    ejecting the slide from the slide carrier using a slide ejector, wherein the slide carrier comprises a plurality of evenly spaced flat shelves coupled to the at least one wall, wherein each evenly spaced flat shelf of the plurality of evenly spaced flat shelves is configured to support a slide in a substantially horizontal position relative to the ground, and wherein the slide is ejected with the slide ejector while in the substantially horizontal position;
    reading a label of the slide using a label reader; and
    utilizing a processor for determining one or more processes to be performed on the slide based on the label read by the label reader.

2. The method of claim 1, further comprising retrieving the one or more processes from a memory that is communicatively coupled to the processor.

3. The method of claim 1, wherein the one or more processes include one or more of pre-treatment of paraffin embedded samples, deparaffinizing, antigen retrieval, drying, washing, staining, immunohistochemistry protocols, in situ hybridization protocols, visualization, microscopy, imaging, or other analysis.

4. The method of claim 1, further comprising returning the slide to the slide carrier.

5. The method of claim 1, wherein the cracking element comprises a cracking surface.

6. The method of claim 1, wherein the slide ejector comprises an ejector element coupled to a drive mechanism for ejecting the slide from the slide carrier.

7. The method of claim 6, wherein the ejector element is movable between a first position and a second position, wherein in the first position an elongate portion of the ejector element is located proximal to a first end of a first slide supported within the slide carrier and in a second position the elongate portion of the ejector element is in contact with the first end of the first slide supported within the slide carrier.

8. The method of claim 1, wherein the label reader comprises one of an optical sensor or a barcode scanner.

9. The method of claim 1, wherein the label comprises one or more attributes, wherein the one or more attributes include at least one of an age of the one or more slides, a specimen type disposed on the slide, and stain information.

10. The method of claim 1, wherein the determining of the one or more processes to be performed are derived from one or more databases.

11. The method of claim 1, further comprising transporting the slide to a downstream processing unit.

12. The method of claim 1, wherein the label comprises a bar code.

13. The method of claim 1, wherein the adhesive bond is a wax bond.

14. A method for processing a specimen, the method comprising:
    cracking an adhesive bond between a slide and a slide carrier and/or between the slide and one or more adjacent slides within the slide carrier with a cracking element by contacting the cracking element with at least one wall of the slide carrier, wherein the cracking element has a cracking surface and is coupled to an actuator, and wherein the cracking element is movable by the actuator between a first position located adjacent to but not in contact with the at least one wall of the slide carrier and a second position in contact with the at least one wall of the slide carrier but not in contact with the slide; and
    ejecting the slide from the slide carrier using a slide ejector, wherein the slide carrier comprises at least one wall and a plurality of evenly spaced flat shelves coupled to the at least one wall, wherein each evenly spaced flat shelf of the plurality of evenly spaced flat shelves is configured to support the slide in a substantially horizontal position relative to the ground, and wherein the slide is ejected with the slide ejector while in the substantially horizontal position.

15. The method of claim 14, wherein the adhesive bond is a wax bond.

16. A method for processing a specimen, the method comprising:
    obtaining a slide carrier including at least one slide having an adhesive bond between the at least one slide and the slide carrier, wherein the slide carrier comprises at least one wall and a plurality of evenly spaced flat shelves coupled to the at least one wall, wherein each evenly spaced flat shelf of the plurality of evenly spaced flat shelves is configured to support the slide in a substantially horizontal position relative to the ground;
    contacting the slide carrier with a force sufficient to break the adhesive bond between the at least one slide and the slide carrier by contacting the at least one wall of the slide carrier with a crackling element, wherein the cracking element has a cracking surface and is coupled to an actuator;
    ejecting the at least one slide having the broken adhesive bond from the slide carrier using a slide ejector, wherein the at least one slide having the broken adhesive bond is ejected while the at least one slide having the broken adhesive bond is substantially in a horizontal position;
    reading a label of the slide using a label reader; and
    utilizing a processor for determining one or more processes to be performed on the slide based on the label read by the label reader.

17. The method of claim 16, wherein the adhesive bond is a wax bond.

18. The method of claim 16, wherein the force is at least 25 Newtons.

19. The method of claim 16, wherein two or more adhesive bonds are independently broken between two or more slides and the slide carrier.

\* \* \* \* \*